United States Patent
Fujinami et al.

(10) Patent No.: US 11,900,184 B2
(45) Date of Patent: Feb. 13, 2024

(54) MULTIPLY-ACCUMULATE DEVICE AND MULTIPLY-ACCUMULATE METHOD

(71) Applicant: Sony Corporation, Tokyo (JP)

(72) Inventors: Yasushi Fujinami, Tokyo (JP); Hiroyuki Yamagishi, Tokyo (JP)

(73) Assignee: Sony Group Corporation, Tokyo (JP)

( * ) Notice: Subject to any disclaimer, the term of this patent is extended or adjusted under 35 U.S.C. 154(b) by 644 days.

(21) Appl. No.: 16/973,237

(22) PCT Filed: Jul. 5, 2019

(86) PCT No.: PCT/JP2019/026915
§ 371 (c)(1),
(2) Date: Dec. 8, 2020

(87) PCT Pub. No.: WO2020/013103
PCT Pub. Date: Jan. 16, 2020

(65) Prior Publication Data
US 2021/0240944 A1   Aug. 5, 2021

(30) Foreign Application Priority Data

Jul. 12, 2018 (JP) ................................. 2018-132700

(51) Int. Cl.
G06F 7/544   (2006.01)
G06G 7/60   (2006.01)
G06G 7/16   (2006.01)
G06G 7/184   (2006.01)
G06N 3/049   (2023.01)

(52) U.S. Cl.
CPC .............. *G06G 7/60* (2013.01); *G06F 7/5443* (2013.01); *G06G 7/16* (2013.01); *G06G 7/184* (2013.01); *G06N 3/049* (2013.01)

(58) Field of Classification Search
CPC ......... G06F 7/5443; G06F 7/16; G06N 3/045; G06N 3/065
USPC ....................................................... 708/603
See application file for complete search history.

(56) References Cited

FOREIGN PATENT DOCUMENTS

| JP | 06-326572 A | 11/1994 |
| JP | 07-141313 A | 6/1995 |
| JP | 11-306268 A | 11/1999 |
| WO | 2018/034163 A1 | 2/2018 |

OTHER PUBLICATIONS

Machine Translation JP 6-326572 A, Nov. 25, 1994. (Year: 1994).*
Machine Translation JP 7-141313 A, Jun. 2, 1995. (Year: 1995).*
International Search Report (PCT/ISA/210), International Application No. PCT/JP2019/026915, dated Aug. 30, 2019.

(Continued)

*Primary Examiner* — Tan V Mai
(74) *Attorney, Agent, or Firm* — Michael Best & Friedrich LLP

(57) ABSTRACT

A multiply-accumulate device (10) includes: a comparison unit (18) that compares, with a threshold voltage, a voltage generated by an electric charge stored in a storage unit (14), and outputs an output signal at timing at which the voltage exceeds the threshold voltage; and a control circuit (110) that reduces, based on a predetermined set value, a charging current to the storage unit (14) from a plurality of input units (13) connected to the storage unit (14).

13 Claims, 13 Drawing Sheets

(56) References Cited

OTHER PUBLICATIONS

Notification of Transmittal of the International Search Report and the Written Opinion of the International Searching Authority, or the Declaration (PCT/ISA/220), International Application No. PCT/JP2019/026915, dated Sep. 10, 2019.
Written Opinion of the International Search Authority (PCT/ISA/237), International Application No. PCT/JP2019/026915, dated Sep. 10, 2019.

* cited by examiner

FIG.8
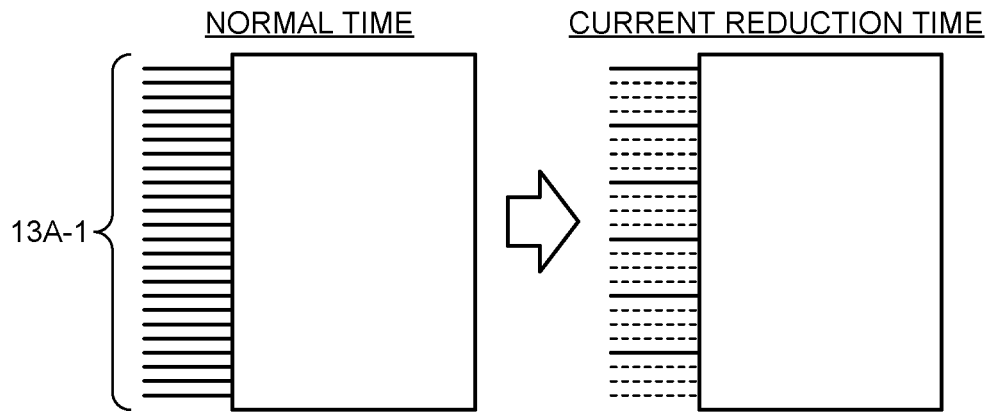
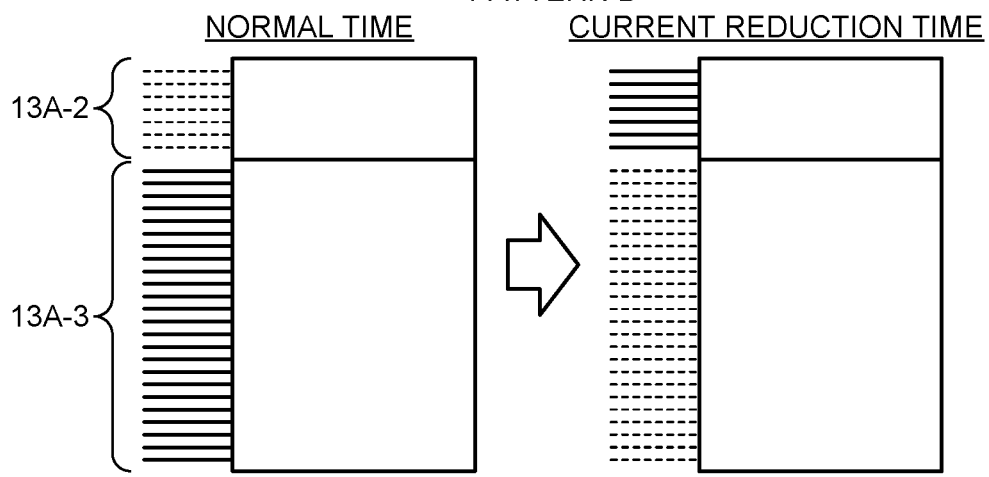
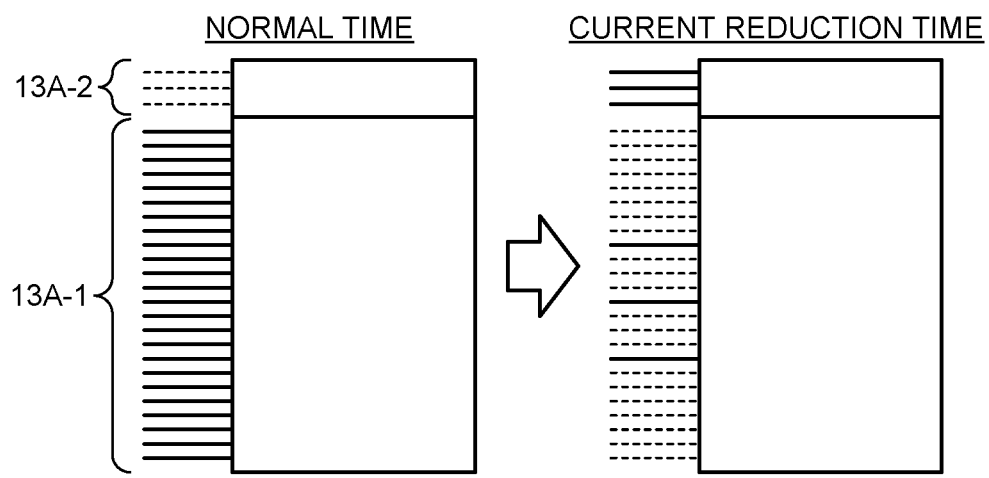

FIG.10
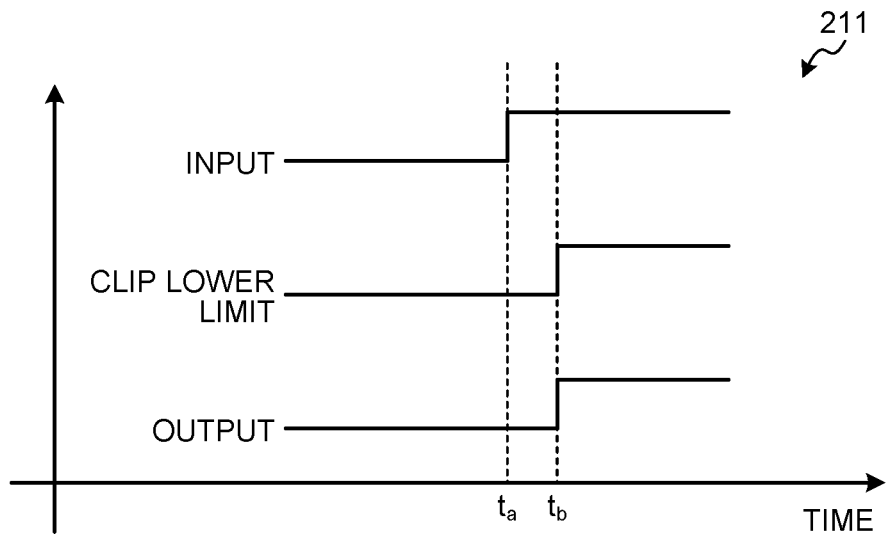
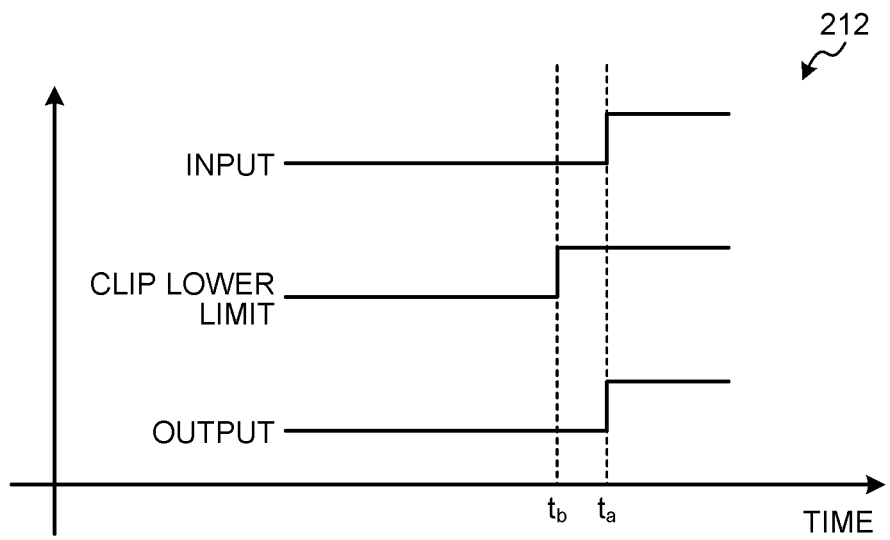
FIG.11
|  |  | INPUT SIGNAL | |
|---|---|---|---|
|  |  | 0 | 1 |
| CLIP LOWER LIMIT | 0 | 0 | 0 |
|  | 1 | 0 | 1 |

FIG.12
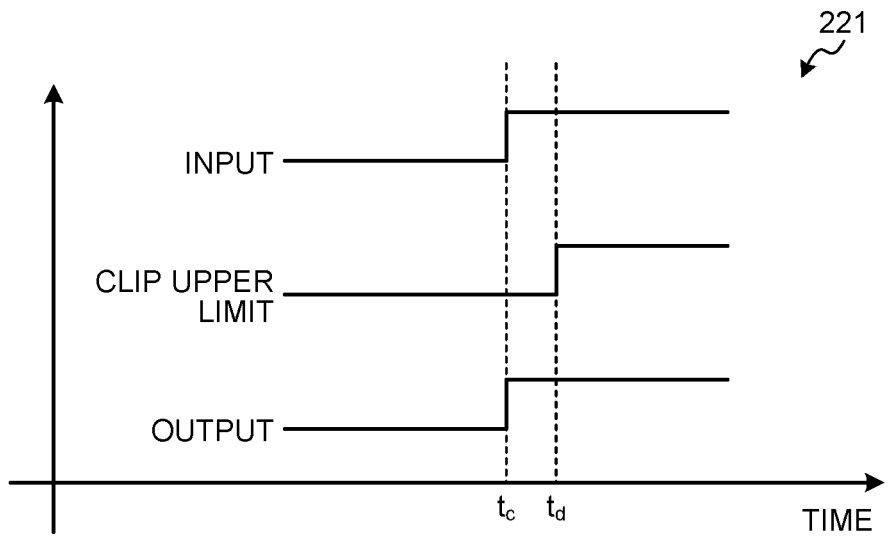
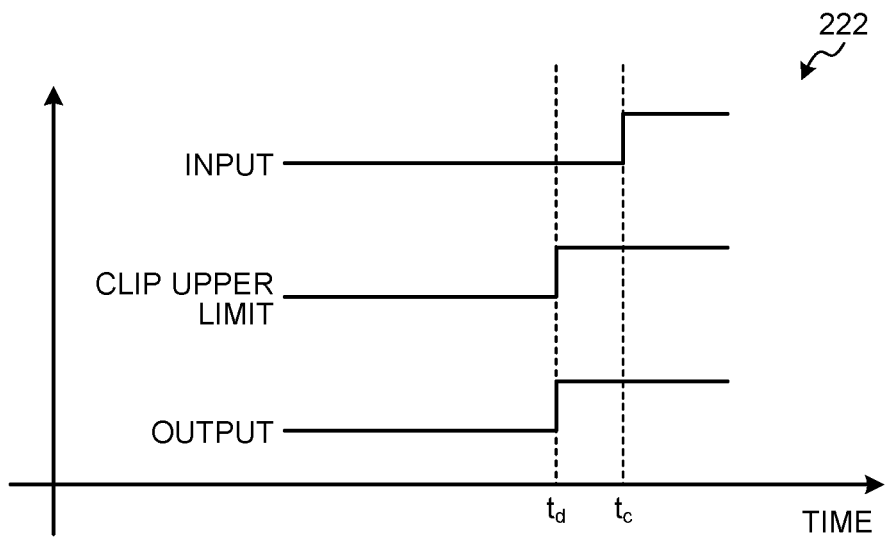
FIG.13
|  |  | INPUT SIGNAL | |
|---|---|---|---|
|  |  | 0 | 1 |
| CLIP UPPER LIMIT | 0 | 0 | 1 |
|  | 1 | 1 | 1 |

MULTIPLY-ACCUMULATE DEVICE AND MULTIPLY-ACCUMULATE METHOD

FIELD

The present disclosure relates to a multiply-accumulate device and a multiply-accumulate method.

BACKGROUND

In recent years, various neural network calculation circuits have been proposed.

For example, Patent Literature 1 discloses a technique for executing a calculation based on rising timing of a signal output from a comparator in a time-axis analog multiply-accumulate circuit including RC circuits and the comparator.

CITATION LIST

Patent Literature

Patent Literature 1: WO 2018/034163 A

SUMMARY

Technical Problem

However, in the above-described conventional technique, an output from a multiplier-accumulator in a previous stage is directly output to a multiplier-accumulator in a subsequent stage. In this case, the timing of each signal output from the comparator is reduced, and it may be difficult to determine timing at which the signal is output.

Therefore, the present disclosure proposes a multiply-accumulate device and a multiply-accumulate method which are capable of expanding the timing of the signal output.

Solution to Problem

To solve the problem described above, a multiply-accumulate device includes: a comparison unit that compares, with a threshold voltage, a voltage generated by an electric charge stored in a storage unit, and outputs an output signal at timing at which the voltage exceeds the threshold voltage; and a control circuit that reduces, based on a predetermined set value, a charging current to the storage unit from a plurality of input units connected to the storage unit.

Advantageous Effects of Invention

According to the present disclosure, the timing of the signal output can be expanded. Note that the effect described here is not necessarily limited and may be any effect described in the present disclosure.

BRIEF DESCRIPTION OF DRAWINGS

FIG. 8 is diagrams illustrating an example of output patterns of an input unit, which are for reducing a charging current.

FIG. 10 is diagrams for explaining operations of a first clip circuit.

FIG. 11 is a diagram illustrating a relationship between a clip lower limit specified in the first clip circuit and an input signal input to the first clip circuit.

FIG. 12 is diagrams for explaining operations of a second clip circuit.

FIG. 13 is a diagram illustrating a relationship between a clip lower limit specified in the second clip circuit and an input signal input to the second clip circuit.

DESCRIPTION OF EMBODIMENTS

Figure 1:
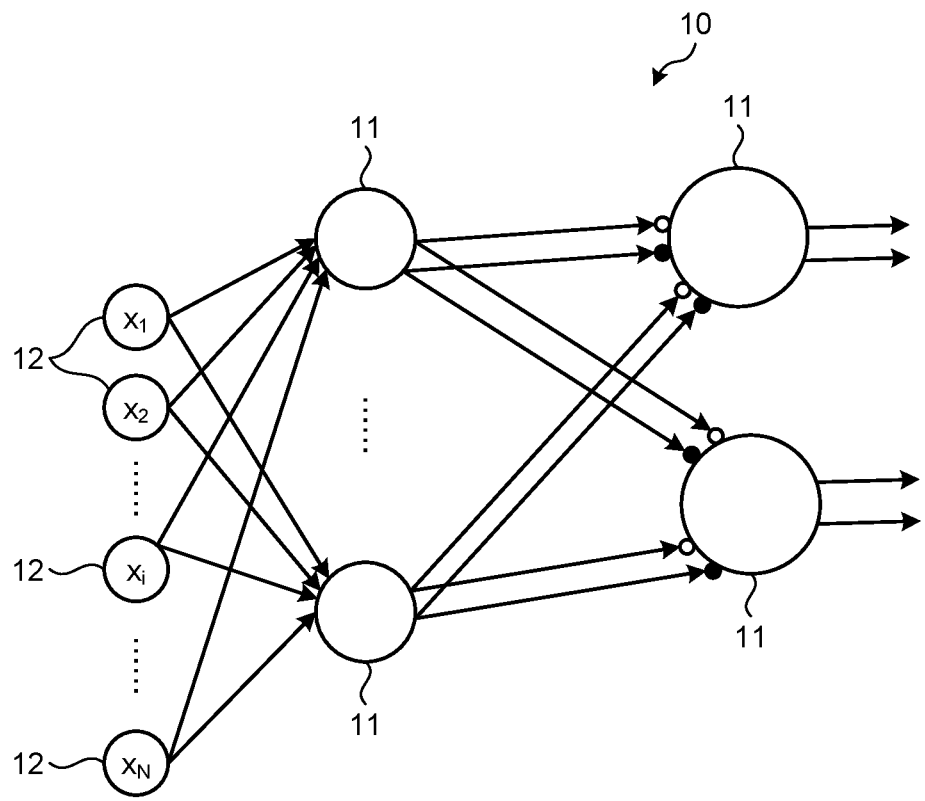
FIG. 1 is a schematic diagram illustrating a multiply-accumulate device.

A detailed description will be given below of embodiments of the present disclosure with reference to the drawings. Note that, in the following respective embodiments, the same reference numerals are given to the same portions, and a duplicate description will be omitted.

Further, the present disclosure will be described in the following item order.

1. Outline
   1-1. Outline of Multiply-Accumulate Device
   1-2. Outline of Multiplier-Accumulator
   1-3. Network Configuration of Multiply-Accumulate Device
2. First Embodiment
   2-1. Configuration of Multiplier-Accumulator of Multiply-Accumulate Device According to First Embodiment
   2-2. Setting of Charge Amount and Threshold Voltage
   2-3. Clip Circuit
   2-4. Modified Example of Multiplier-Accumulator According to First Embodiment
3. Second Embodiment
   3-1. Configuration of Multiplier-Accumulator of Multiply-Accumulate Device According to Second Embodiment

1. Outline

[1-1. Outline of Multiply-Accumulate Device]

First, a description will be given of an outline of a multiply-accumulate device 10 to which each embodiment of the present disclosure is applied. Each multiplier-accumulator 11 of the multiply-accumulate device 10 according to each embodiment of the present disclosure associates a load (weight) $w_i$ with each of N electrical signals $I_i$, and derives a sum of N multiplication values each obtained by multiplying each value of the electrical signal $I_i$ and the load $w_i$ which make a pair, by each other. Here, N is a natural number of 2 or more, and i is a natural number of N or less.

It is assumed that the value represented by the electrical signal $I_i$ (hereinafter, also simply referred to as an electrical signal) is $x_i$, and that the N electrical signals are given to one multiplier-accumulator 11 within a predetermined period $T_1$. In this case, the sum of the N multiplication values, which is obtained by the multiplier-accumulator 11, is represented by the following equation (1).

$$\sum_{i=1}^{N} w_i \cdot x_i \quad (1)$$

As illustrated in FIG. 1, the multiply-accumulate device 10 has a structure in which a plurality of the multipliers-accumulators 11 is provided in each of a plurality of layers. Each of the plurality of multipliers-accumulators 11 in a lowest layer obtains a calculation target value based on values $x_i$ represented by the N electrical signals (for example, pulse signals) given from a plurality of external input units 12 and the load $w_i$ applied to the respective electrical signals. Then, each of the multipliers-accumulators 11 transmits an electrical signal, which represents the calculation target value, to multipliers-accumulators 11 in an upper layer. Note that, in the present disclosure, a magnitude of the load $w_i$, a magnitude of the electrical signal $x_i$, and bit precision of the output of the multiplication-accumulation of the electrical signal $x_i$ and the load $w_i$ are not particularly limited. Specifically, the magnitude of the load $w_i$, the magnitude of the electrical signal $x_i$, and the bit precision of the output of the multiplication-accumulation of the electrical signal $x_i$ and the load $w_i$ are determined independently of one another. A user can select various values, for example, from binary to multiple values for each value. Therefore, the user just needs to set each value in consideration of a balance between performance, cost, and the like of the multiply-accumulate device 10. That is, the user can set each value arbitrarily.

Such multipliers-accumulators 11 in the upper layer each associate the load $w_i$ individually with the values of the electrical signals sent from the plurality of multipliers-accumulators 11 in the lower layer, and obtain a calculation target value. Then, each of the multipliers-accumulators 11 in the upper layer transmits an electrical signal, which represents the calculation target value, to multipliers-accumulators 11 in a further upper layer. The multiply-accumulate device 10 according to each embodiment of the present disclosure is designed so as to be applicable to a neural network. Such a multiply-accumulate device 10 performs, a plurality of times, processing for obtaining the calculation target values by the multipliers-accumulators 11 in the upper layer based on the calculation target values obtained by the multipliers-accumulators 11 in the lower layer. Thus, the multiply-accumulate device 10 executes image recognition processing and the like.

[1-2. Outline of Multiplier-Accumulator]

Figure 2:
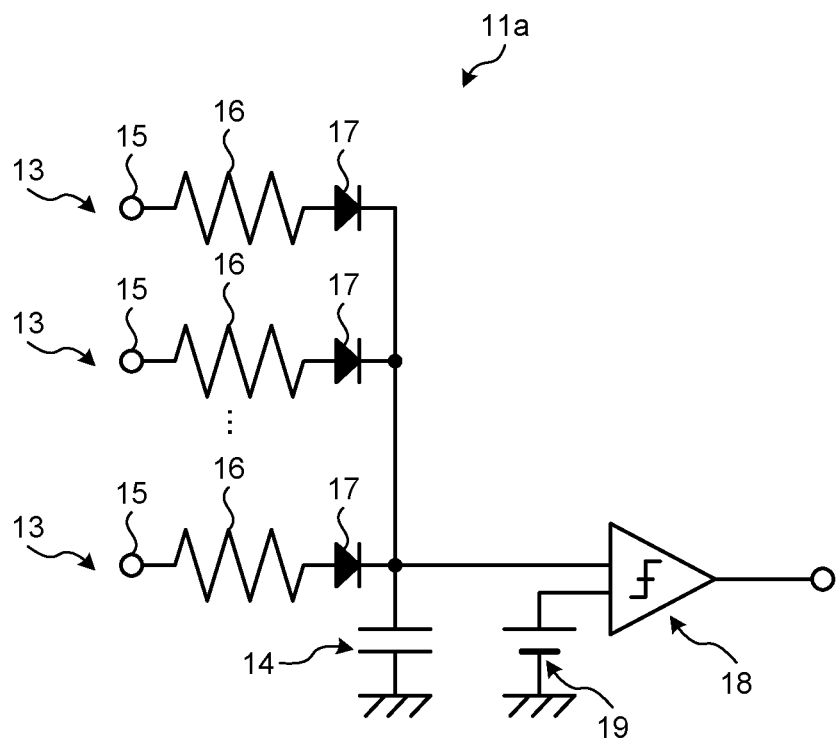
FIG. 2 is a schematic diagram of a multiplier-accumulator of the multiply-accumulate device.

Referring to FIG. 2, a description will be given of a configuration and processing of a multiplier-accumulator 11a, which are an outline of the multiplier-accumulator 11. Here, the description will be given on the assumption that the electrical signal $x_i$ is a variable of 0 or more and 1 or less. Note that, though there are a positive load $w_i^+$ that is a positive value and a negative load $w_i^-$ that is a negative value in the load $w_i$, the description will be given here on the assumption that there is no distinction between the positive and negative of the load.

As illustrated in FIG. 2, the multiplier-accumulator 11a includes N input units 13, a storage unit 14, a comparison unit 18, and a threshold power supply 19.

The N input units 13 are connected in parallel to one another. Each of the input units 13 associates the load $w_i$ with the electrical signal given within the predetermined period $T_1$, and outputs an electric charge having a magnitude corresponding to the value obtained by multiplying the electrical signal $x_i$ and the load $w_i$ by each other. Further, as illustrated in FIG. 2, each input unit 13 includes an input terminal 15, a resistor 16, and a diode 17. The input terminal 15, the resistor 16, and the diode 17 are connected in series to one another. In each input unit 13, for example, each input terminal 15 is given an electrical signal of the same magnitude at different timing within the period $T_1$.

The storage unit 14 is connected to each input unit 13 and stores the electric charge output from each input unit 13. The storage unit 14 is, for example, a capacitor.

Outside the multiplier-accumulator 11a, a length of the period $T_1$ is defined as $T_{in}$, and the following equation (2) is used, whereby the value $x_i$ represented by the electrical signal is converted into timing $t_i$ when the electrical signal is given. That is, the electrical signal is input to the input terminal 15 at the timing $t_i$.

$$t_i = T_{in}(1 - x_i) \quad (2)$$

Assuming that a waveform that is generated from the timing $t_i$ when the electrical signal is given and increases or decreases in proportion to the passage of time t is defined as a response waveform W, an electric charge amount $P_i(t)$ supplied from each input unit 13 to the storage unit 14 can be represented by a magnitude of the response waveform W. Assuming that a slope of the response waveform W with respect to the passage of time t is defined as $k_i$, the load $w_i$ can be converted into $k_i$ using the following equation (3).

$$k_i = \lambda w_i \quad (3)$$

Here, assuming that a waveform obtained by adding all the response waveforms W to one another is defined as a composite waveform TW, a magnitude of the composite waveform TW is the sum total of $P_1(t), P_2(t), P_3(t), \ldots,$ and $P_N(t)$. This is equal to a voltage generated by the storage unit 14. Here, the voltage held in the storage unit 14 is defined as $V_N(t)$.

The comparison unit 18 compares a threshold and a signal input thereto with each other, and outputs a step waveform when the input signal exceeds the threshold. The comparison unit 18 is, for example, a comparator. The comparison unit 18 is connected to the storage unit 14 and the threshold power supply 19.

The threshold power supply 19 gives the threshold voltage to the comparison unit 18. Here, a magnitude of the threshold voltage is defined as θ. In this case, the comparison unit 18 outputs the step waveform at timing at which the voltage $V_N(t)$ held in the storage unit 14 exceeds the threshold θ. Assuming that the timing at which $V_N(t)$ reaches the threshold θ is defined as $t_v$, the following equation (4) is obtained.

$$\sum_{i=1}^{N} k_i(t_v - t_i) = \theta \quad (4)$$

Then, assuming that the sum total of the loads $w_i$ is defined as β, β can be represented by the following equation (5).

$$\beta = \sum_{i=1}^{N} w_i \quad (5)$$

Then, from the equations (2) to (5), the calculation target value of the multiplier-accumulator 11a can be represented by the following equation (6).

$$\sum_{i=1}^{N} w_i \cdot x_i = \frac{\theta/\lambda + \beta(T_{in} - t_v)}{T_{in}} \quad (6)$$

Here, it is assumed that all of the loads $w_i$ are positive values. In this case, when the value $x_i$ represented by the electrical signal given to each input terminal 15 is a minimum value 0, a left side of the equation (6) becomes 0, so that the timing of $t_v$ becomes latest. The timing $t_v^{min}$ can be represented by the following equation (7).

$$t_v^{min} = \frac{\theta}{\lambda\beta} + T_{in} \quad (7)$$

The fact that the left side of the equation (6) is 0 means that the timing at which the step waveform is output from the comparison unit 18 is the latest.

On the other hand, when the value $x_i$ represented by the electrical signal given to each input terminal 15 is a maximum value 1, the left side of the equation (6) becomes β, so that the timing of $t_v$ becomes earliest. The timing $t_v^{max}$ is represented by the following equation (8).

$$t_v^{max} = \frac{\theta}{\lambda\beta} \quad (8)$$

The fact that the left side of the equation (6) is β means that the timing at which the step waveform is output from the comparison unit 18 is the earliest. Therefore, from the equations (7) and (8), a period $T_2$ during which the step waveform is output from the comparison unit 18 is $[t_v^{max}, t_v^{min}]$, and a time length $T_v$ of the period $T_2$ can be given by the following equation (9).

$$T_v = t_v^{min} - t_v^{max} = T_{in} \quad (9)$$

Hence, the time length $T_v$ of the period $T_2$ during which the step waveform is output from the comparison unit 18 becomes equal to the time length $T_{in}$ of the period $T_1$ during which the electrical signal is given to each input unit 13.

In order to reflect all of the electrical signals given to the respective input units 13 to the calculation target value of the multiplier-accumulator 11a, the period $T_2$ needs to be present on and after the period $T_1$, and θ needs to be an appropriate value. For that purpose, a condition shown in the following equation (10) is required.

$$t_v^{max} > T_{in} \quad (10)$$

From the equation (8), the equation (10) can be transformed into the following equation (11).

$$\theta > \lambda\beta T_{in} \quad (11)$$

Here, when ε(>0) of a minute amount is defined, the threshold θ can be expressed by the following equation (12) using ε.

$$\theta = (1 + \varepsilon)\lambda\beta T_{in} \quad (12)$$

From the equation (12), the threshold θ needs to be proportional to a product of the sum total β of the loads $w_i$ and the length $T_{in}$ of the period $T_1$.

The following equation (13) is obtained from the equations (7) and (12), and the following equation (14) is obtained from the equations (8) and (12).

$$t_v^{min} = 2T_{in} + \varepsilon T_{in} \quad (13)$$

$$t_v^{max} = T_{in} + \varepsilon T_{in} \quad (14)$$

Hence, a time range of the period $T_2$ can be represented by the equations (13) and (14).

Figure 3:
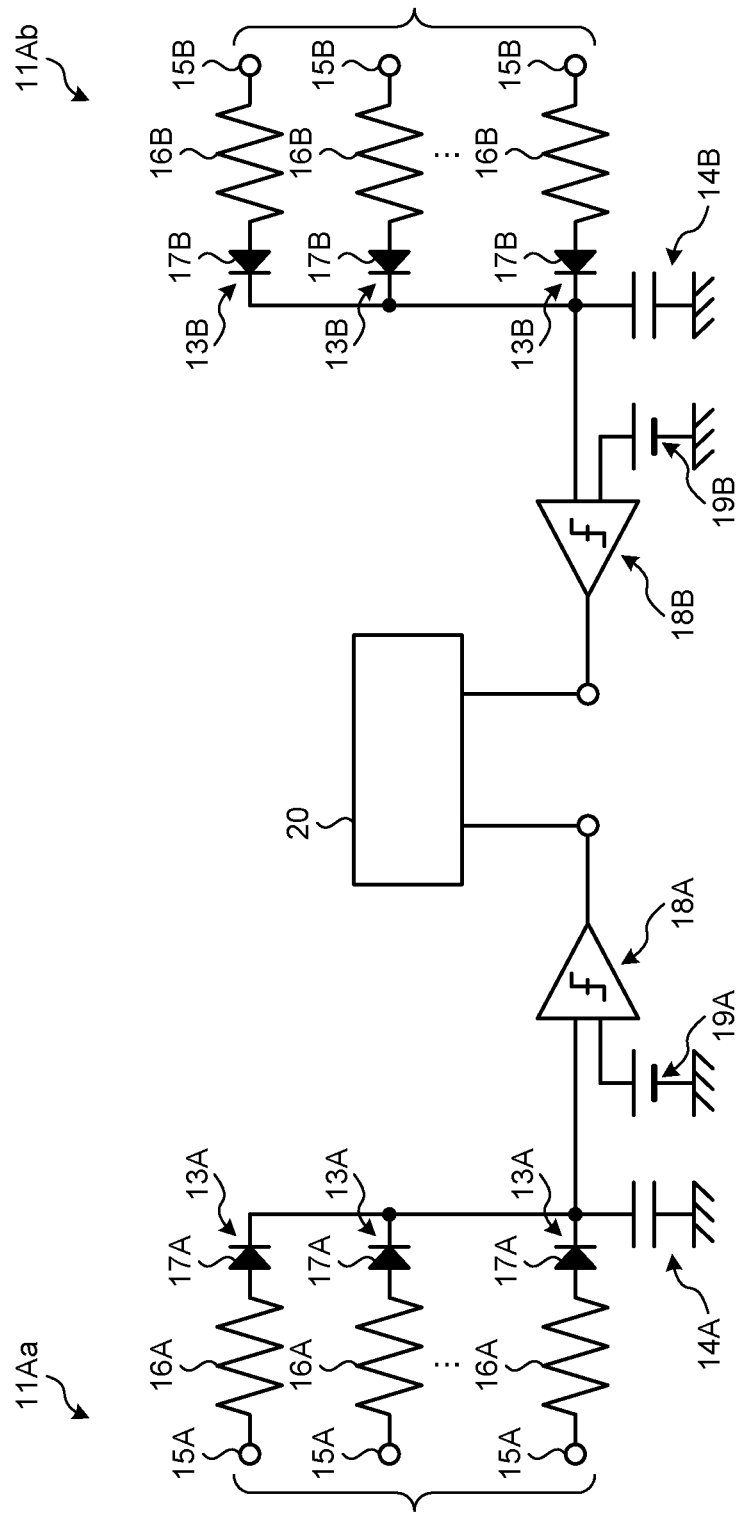
FIG. 3 is a diagram illustrating an example of a configuration of the multiplier-accumulator.

Referring to FIG. 3, a description will be given of a multiplier-accumulator that obtains the calculation target value while distinguishing the load $w_i$ into the positive load $w_i^+$ and the negative load FIG. 3 is a view illustrating an example of a configuration of the multiplier-accumulator that obtains the calculation target value while distinguishing the load $w_i$ into the positive load $w_i^+$ and the negative load $w_i^-$.

For the N electrical signals given in the period $T_1$, a multiplier-accumulator 11A associates $w_i^+$ with each of $N_+$ electrical signals ($N_+$ is a natural number of N or less). The multiplier-accumulator 11A associates an absolute value of $w_i^-$ with each of (N-$N_+$) electrical signals. Such a multiplier-accumulator 11A includes a first multiplier-accumulator 11Aa, a second multiplier-accumulator 11Ab, and a calculation unit 20.

As illustrated in FIG. 3, the first multiplier-accumulator 11Aa includes $N^+$ first input units 13A, a first storage unit 14A, a first comparison unit 18A, and a first threshold power supply 19A.

The first input units 13A are connected in parallel to one another. Each of the first input units 13A associates the load $w_i^+$ with the electrical signal given within the predetermined period $T_1$, and outputs a response waveform in which a voltage changes with the passage of time. Further, as illustrated in FIG. 3, each first input unit 13A includes a first input terminal 15A, a first resistor 16A, and a first diode 17A. The first input terminal 15A, the first resistor 16A, and the first diode 17A are connected in series to one another. In each first input unit 13A, for example, each first input terminal 15A is given an electrical signal of the same voltage at different timing within the period $T_1$.

The first storage unit 14A is connected to each first input unit 13A and stores an electric charge output from each first input unit 13A. The first storage unit 14A is, for example, a capacitor.

The first comparison unit 18A compares a first threshold and a signal input thereto with each other, and outputs a step waveform at the time (hereinafter, referred to as first timing) when the input signal exceeds the first threshold. The first comparison unit 18A is, for example, a comparator. The first comparison unit 18A is connected to the first storage unit 14A and the first threshold power supply 19A.

The first threshold power supply 19A gives a first threshold voltage to the first comparison unit 18A. Here, a magnitude of the first threshold voltage is defined as $\theta^+$. In this case, the first comparison unit 18A outputs the step waveform at timing at which the voltage held in the first storage unit 14A exceeds the first threshold $\theta^+$.

As illustrated in FIG. 3, the second multiplier-accumulator 11Ab includes $(N-N^+)=N^-$ second input units 13B, a second storage unit 14B, a second comparison unit 18B, and a second threshold power supply 19B.

The second input units 13B are connected in parallel to one another. Each of the second input units 13B associates the load $w_i^-$ with the electrical signal given within the predetermined period $T_1$, and outputs a response waveform in which a voltage changes with the passage of time. Further, as illustrated in FIG. 3, each second input unit 13B includes a second input terminal 15B, a second resistor 16B, and a second diode 17B. The second input terminal 15B, the second resistor 16B, and the second diode 17B are connected in series to one another. In each second input unit 13B, for example, each second input terminal 15B is given an electrical signal of the same magnitude at different timing within the period $T_1$. That is, the period during which $N^+$ electrical signals are given to the $N^+$ first input units 13A coincides with the period during which $N^-$ electrical signals are given to the $N^-$ second input units 13B.

The second storage unit 14B is connected to each second input unit 13B and stores an electric charge output from each second input unit 13B. The second storage unit 14B is, for example, a capacitor.

The second comparison unit 18B compares a second threshold and a signal input thereto with each other, and outputs a step waveform at the time (hereinafter, referred to as second timing) when the input signal exceeds the second threshold. The second comparison unit 18B is, for example, a comparator. The second comparison unit 18B is connected to the second storage unit 14B and the second threshold power supply 19B.

The second threshold power supply 19B gives a second threshold voltage to the second comparison unit 18B. Here, a magnitude of the second threshold voltage is defined as $\theta^-$. In this case, the second comparison unit 18B outputs the step waveform at timing at which the voltage held in the second storage unit 14B exceeds the second threshold $\theta^-$.

Here, a magnitude of the first threshold is defined as $\theta^+$, a magnitude of the second threshold is defined as $\theta^-$, the sum total of $N^+$ positive loads $w_i^+$ is defined as $\beta^+$, and the sum total of absolute values of $N^-$ negative loads $w_i^-$ is defined as $\beta^-$. In this case, $\beta^+$ and $\beta^-$ can be represented by the following equations (15) and (16), respectively.

$$\beta^+ = \sum_{i=1}^{N^+} w_i^+ \tag{15}$$

$$\beta^- = \sum_{i=1}^{N} |w_i^-|(>0) \tag{16}$$

Here, $N=N^++N^-$ and $\beta=\beta^+-\beta^-$ are established. Assuming that the first timing is defined as $t_v^+$ and that the second timing is defined as $t_v^-$, then from the equation (4), $\theta^+$ and $\theta^-$ can be represented by the following equations (17) and (18), respectively.

$$\sum_{i=1}^{N^+} w_i^+(t_v^+ - t_i) = \theta^+ \tag{17}$$

$$\sum_{i=1}^{N^-} |w_i^-|(t_v^- - t_i) = \theta^-(>0) \tag{18}$$

Note that $\lambda=1$ is set in the equations (17) and (18). The following equations (19) and (20) are obtained when the calculation target value (sum of N multiplication values) is divided into a calculation target value (hereinafter, a first product sum value) of the positive load $w_i^+$ and a calculation target value (hereinafter, a second product sum value) of the negative load $w_i^-$.

$$\sum_{i=1}^{N^+} w_i^+ \cdot x_i = \frac{\theta^+ + \beta^+(T_{in} - t_v^+)}{T_{in}} \tag{19}$$

$$\sum_{i=1}^{N^-} |w_i^-| \cdot x_i = \frac{\theta^- + \beta^-(T_{in} - t_v^-)}{T_{in}} \tag{20}$$

The calculation unit 20 calculates the calculation target value by subtracting the second product sum value from the first product sum value. Specifically, the calculation unit 20 is connected to the first comparison unit 18A, detects pulse signals transmitted from the first comparison unit 18A, and calculates the first product sum value. The calculation unit 20 is connected to the second comparison unit 18B, detects pulse signals transmitted from the second comparison unit 18B, and calculates the second product sum value.

In other words, the calculation unit 20 detects that the voltage held in the first storage unit 14A has reached the first threshold $\theta^+$, and calculates the first product sum value. The calculation unit 20 detects that the voltage held in the second storage unit 14B has reached the second threshold $\theta^-$, and calculates the second product sum value. Then, the calculation unit 20 calculates the calculation target value by subtracting the second product sum value from the first product sum value. An equation for calculating the calculation target value can be represented by the following equation (21).

$$\sum_{i=1}^{N} w_i \cdot x_i = \frac{\theta^+ - \theta^- + \beta T_{in} - (\beta^+ t_v^+ - \beta^- t_v^-)}{T_{in}} \quad (21)$$

Here, it is assumed that the calculation unit 20 calculates the first product sum value and the second product sum value in the period $T_2$. In this case, in order to reflect all of the electrical signals given to the respective first input units 13A and all of the electrical signals given to the respective second input units 13B to the calculation target value, the period $T_2$ needs to be present on and after the period $T_1$. Moreover, the time length of the period $T_1$ and the time length of the period $T_2$ are both $T_{in}$. Then, for that purpose, the first threshold $\theta^+$ and the second threshold $\theta^-$ need to satisfy the following equations (22) and (23), respectively.

$$\theta^+ = (1+\varepsilon)\lambda\beta^+ T_{in} \quad (22)$$

$$\theta^- = (1+\varepsilon)\lambda\beta^- T_{in} \quad (23)$$

As shown in the equation (22), the first threshold $\theta^+$ is proportional to a product of the sum total $\beta^+$ of $N^+$ loads $w_i^+$ and the length $T_{in}$ of the period $T_1$. As shown in the equation (23), the second threshold $\theta^-$ is proportional to a product of the sum total $\beta^-$ of the absolute values of $N^-$ loads $w_i^-$ and the length $T_{in}$ of the period T1. The first threshold $\theta^+$ and the second threshold $\theta^-$ satisfy the above-described relationships, whereby all of the electrical signals given to the respective first input units 13A and all of the electrical signals given to the respective second input units 13B can be reflected to the calculation target value. In other words, values of the first threshold $\theta^+$ and the second threshold $\theta^-$ just need to be determined so as to satisfy the equations (22) and (23).

However, on a right side of the equation (21), a product of $t_v+$ and $\beta^+$ and a product of $t_v^-$ and $\beta^-$ are present. Therefore, in order to calculate the calculation target value based on the equation (21), the calculation unit 20 requires a complicated circuit configuration.

Therefore, in order to simplify the circuit configuration of the calculation unit 20, an absolute value of a dummy load $w_0$ that corresponds to a virtual electrical signal of a value 0 and is obtained by multiplying a difference between $\beta^+$ and $\beta^-$ by −1 is added to a smaller one of $\beta^+$ and $\beta^-$. $w_0$ can be represented by the following equation (24).

$$w_o = -(\beta^+ + \beta^-) \quad (24)$$

By adding the dummy load $w_0$, $\beta^+ = \beta^-$ is established. From the equations (22) and (23), $\theta^+ = \theta^-$ is established. Therefore, $\beta^+ = \beta^- = \beta_0$ is established, and the equation (21) can be transformed into the following equation (25).

$$\sum_{i=1}^{N} w_i \cdot x_i = \frac{\beta_0(t_v^- - t_v^+)}{T_{in}} \quad (25)$$

As shown in the equation (25), when the positive load $w_i^+$ and the negative load $w_i^-$ are mixed, the calculation target value can be calculated based on a difference between the first timing and the second timing.

Here, if "$t_v^- - t_v^+$" that is the difference between the first timing and the second timing is input to a next layer as it is, "$t_v^- - t_v^+$" is multiplied by a reciprocal $(1/\beta)$ of the sum total of the loads. That is, for example, when simulation of a neural network is executed using this multiply-accumulate method, a distribution of the outputs from the multiplier-accumulator 11 is reduced as going deeper.

[1-3. Network Configuration of Multiply-Accumulate Device]

Figure 4:
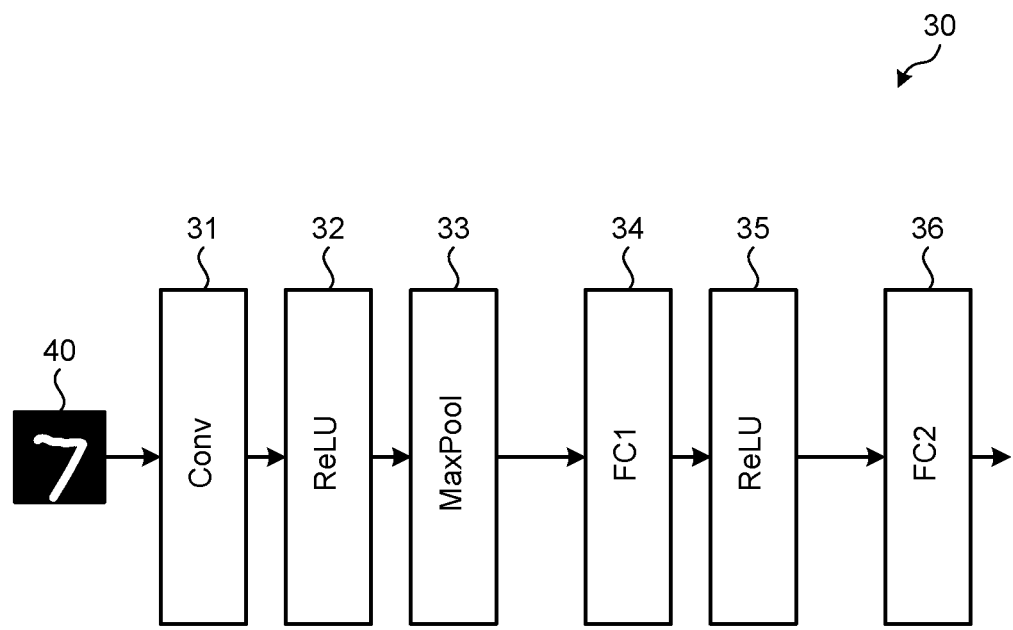
FIG. 4 is a diagram for explaining output timing of the multiplier-accumulator.

Referring to FIG. 4, a description will be given of an example of a case in which the distribution of the outputs from the multiplier-accumulator 11 is reduced. FIG. 4 is a diagram illustrating an example of a configuration of deep neural networks (DNNs) of the multiply-accumulate device 10.

As illustrated in FIG. 4, DNN 30 includes a Convolution layer 31, a first ReLU layer 32, a MaxPooling layer 33, a first FC layer 34, a second ReLU layer 35, and a second FC layer 36. Processing for causing the DNN 30 as described above to recognize a character 40 of MNIST is considered.

Figure 5:
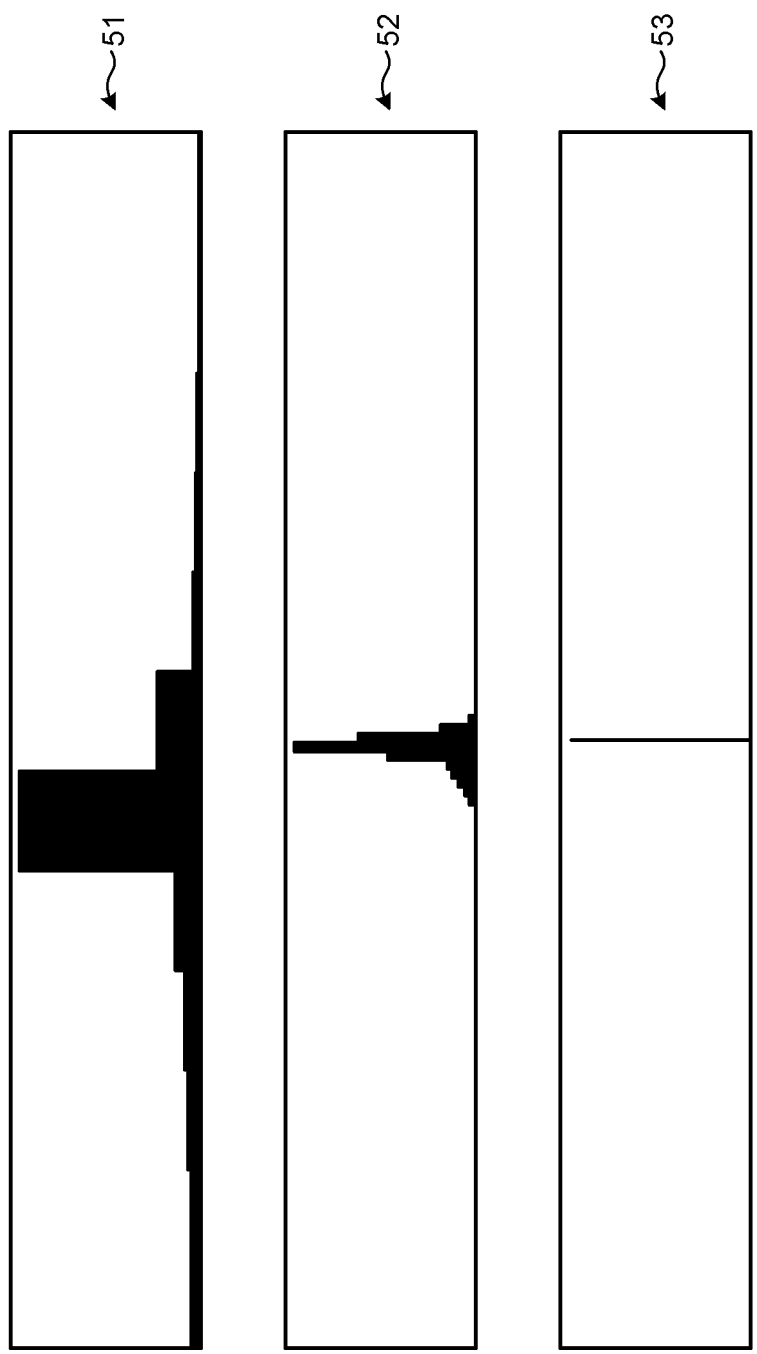
FIG. 5 is a diagram for explaining distributions of pieces of the output timing of the multiplier-accumulator.

FIG. 5 is histograms illustrating distributions of the outputs from the multipliers-accumulators in the respective layers. A histogram 51 is a histogram showing a distribution of $(t_v^- - t_v^+)$ output from the Convolution layer 31. A histogram 52 is a histogram showing a distribution of $(t_v^- - t_v^+)$ output from the first FC layer 34. A histogram 53 is a histogram showing a distribution of $(t_v^- - t_v^+)$ output from the second FC layer 36. As illustrated in FIG. 5, while the histogram 51 has a wide time distribution of pieces of output timing, the histogram 53 has output timing concentrated at one point. In this case, it may become impossible to determine the timing at which the step waveform is output.

Therefore, the multiply-accumulate device according to the present disclosure executes processing for expanding an interval of the timing at which the step waveform is output. Thus, the multiply-accumulate device according to the present disclosure can delay a time from the output of the step waveform to the output of the next step waveform, and accordingly, can prevent the concentration of the timing at which the step waveform is output.

2. First Embodiment

[2-1. Configuration of Multiplier-Accumulator of Multiply-Accumulate Device According to First Embodiment]

Figure 6:
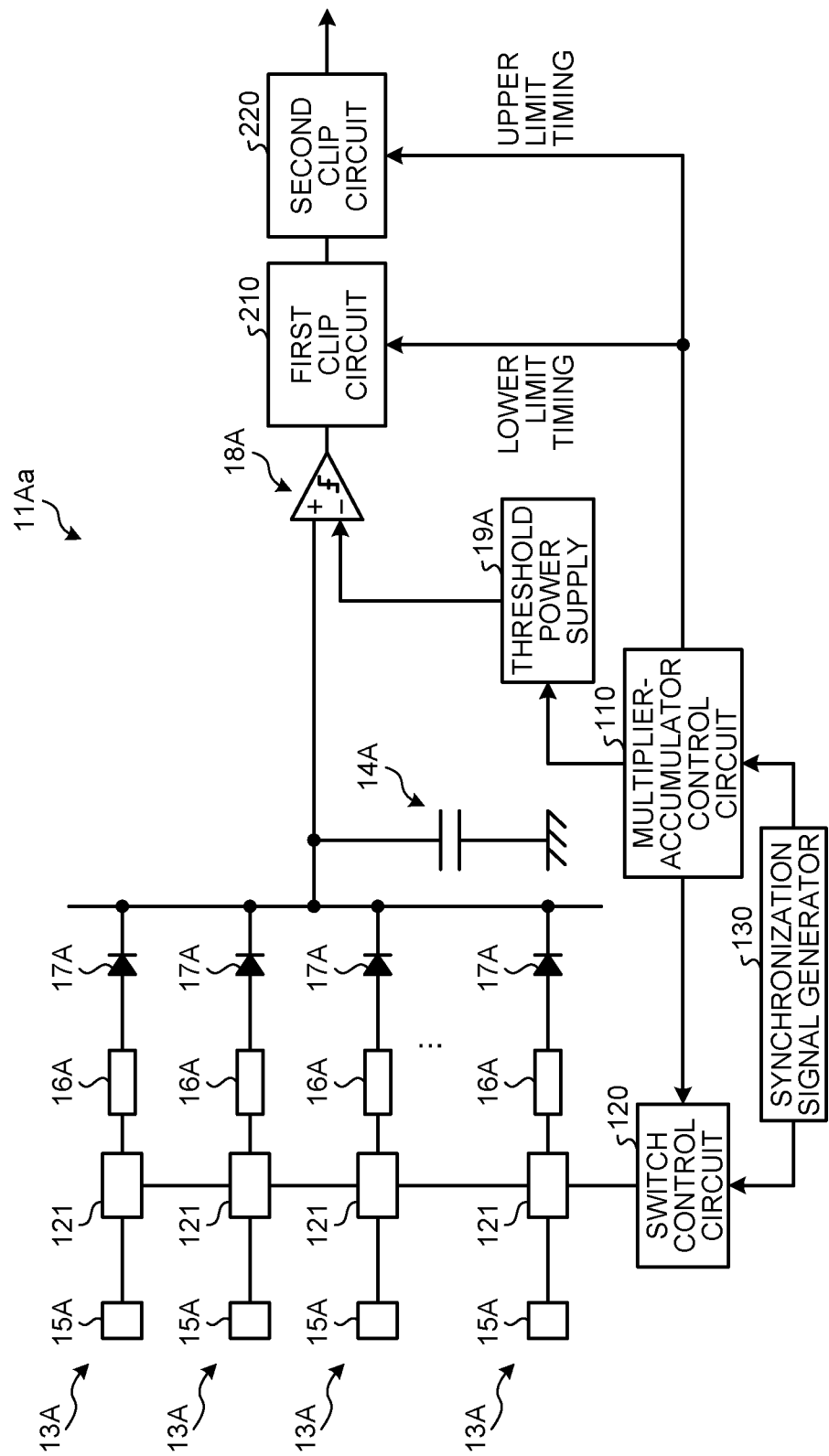
FIG. 6 is a diagram illustrating an example of a multiplier-accumulator of a multiply-accumulate device according to a first embodiment of the present disclosure.

Referring to FIG. 6, a description will be given of the multiplier-accumulator of the multiply-accumulate device according to the first embodiment of the present disclosure. FIG. 6 is a diagram illustrating an example of a configuration of the multiplier-accumulator of the multiply-accumulate device according to the first embodiment of the present disclosure. Note that, for the sake of simplicity, FIG. 6 illustrates only the first multiplier-accumulator 11Aa having a positive load in the multiplier-accumulator 11A. The second multiplier-accumulator 11Ab having an absolute value of a negative load can be configured similarly to the first multiplier-accumulator 11Aa, and accordingly, a description thereof will be omitted.

As illustrated in FIG. 6, the first multiplier-accumulator 11Aa includes the plurality of (N) first input units 13A, the first storage unit 14A, the first comparison unit 18A, the first threshold power supply 19A, a multiplier-accumulator control circuit 110, a switch control circuit 120, a synchronization signal generator 130, a first clip circuit 210, and a second clip circuit 220. As will be specifically described later, the first multiplier-accumulator 11Aa reduces a charging current for charging the first storage unit 14A, thereby reducing the charging current and lowering the threshold voltage. The charging current is reduced, and a charging speed to the first storage unit 14A is slowed, whereby the timing of the signal output from the first comparison unit 18A is expanded.

Figure 7:
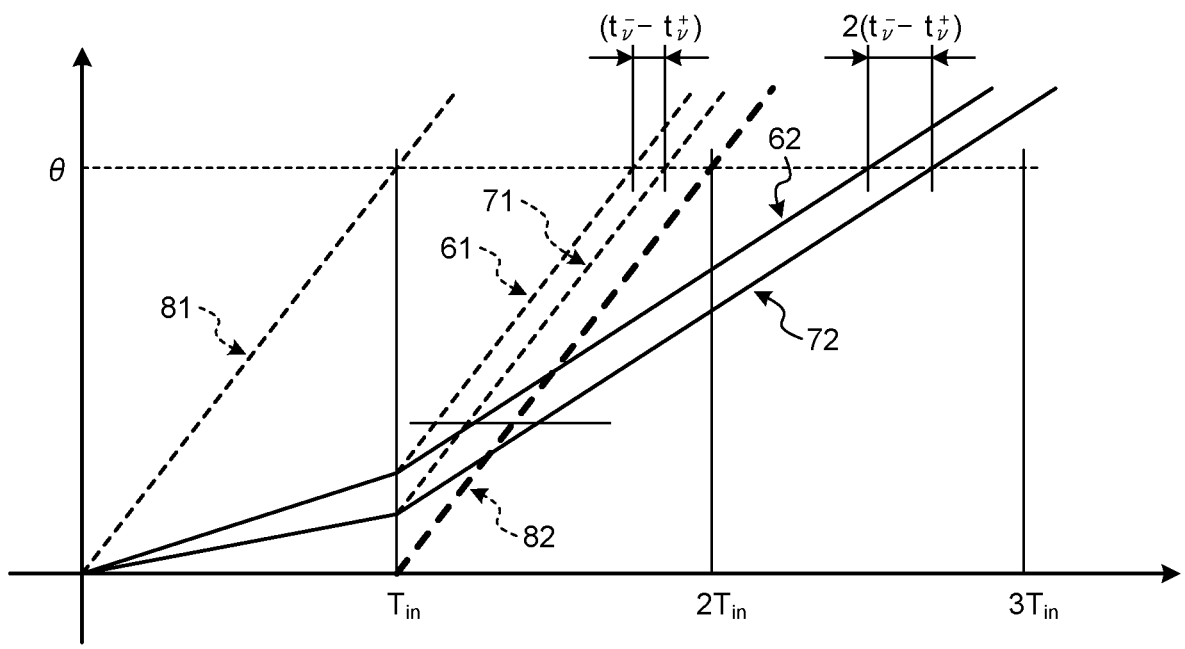
FIG. 7 is a diagram illustrating an example of charge curves which are time changes of a charge amount.

Referring to FIG. 7, a description will be given of the charging speed of the electric charge charged to the first storage unit 14A. FIG. 7 is a diagram illustrating charge curves which are time changes of the charge amount of the first storage unit 14A.

A charge curve 61 is a charge curve when the step waveform is output at the first timing $t_v^+$ in the first multiplier-accumulator 11Aa having a positive load. As shown in the charge curve 61, the first storage unit 14A is charged by some of the plurality of first input units 13A between time 0 and time $T_{in}$. Then, the first storage unit 14A is charged from all of the first input units 13A when the time reaches $T_{in}$. A charge curve 71 is a charge curve when the step waveform is output at the second timing $t_v^-$ in the second multiplier-accumulator 11Ab having an absolute value of a negative load. Here, since the signal is output from the multiplier-accumulator at the time when the voltage stored in the storage unit 14 reaches the threshold in a period from $T_{in}$ to $2T_{in}$ a period of $T_{in} \leq t \leq 2T_{in}$ is called a VT conversion period.

A charge curve 81 shows a charge curve when the step waveform is output at earliest timing. In this case, from the point of time 0, the first storage unit 14A is started to be charged from all of the first input units 13A. A charge curve 82 shows a charge curve when the step waveform is output at latest timing. In this case, the first storage unit 14A is not charged during a time period from time 0 to time $T_{in}$ and is started to be charged from the point of time $T_{in}$.

As mentioned above, in the multiplier-accumulator in which the first multiplier-accumulator 11Aa having a positive load and the second multiplier-accumulator 11Ab having an absolute value of a negative load are mixed, the signal is output based on the difference between the first timing and the second timing. Therefore, the difference between the first timing and the second timing becomes large by increasing a difference between the charge curve 61 and the charge curve 71 in the VT conversion period. As a result, the signal output from the calculation unit 20 becomes large. Specifically, slopes of the charge curve 61 and the charge curve 71 in the VT conversion period are individually halved, for example.

Thus, the charge curve 61 is converted into a charge curve 62, and the charge curve 71 is converted into a charge curve 72. In this case, since the output from the first multiplier-accumulator 11Aa is output as a signal in a period from $T_{in}$ to $3T_{in}$, the VT conversion period is changed to $T_{in} \leq t \leq 3T_{in}$. Then, the difference between the charge curve 72 and the charge curve 62 in the VT conversion period is doubled as compared with the difference between the charge curve 71 and the charge curve 61.

FIG. 6 will be referred to again. The multiplier-accumulator control circuit 110 controls each unit that constitutes the first multiplier-accumulator 11Aa. Specifically, the multiplier-accumulator control circuit 110 controls the first threshold power supply 19A, the switch control circuit 120, the synchronization signal generator 130, the first clip circuit 210, and the second clip circuit 220. The multiplier-accumulator control circuit 110 can be achieved by, for example, an electronic circuit including a central processing unit (CPU).

As illustrated in FIG. 6, each of the first input units 13A includes the first input terminal 15A, the first resistor 16A, the first diode 17A, and a switch unit 121. The switch unit 121 is provided between the first input terminal 15A and the first resistor 16A. The switch unit 121 opens and closes a route between the first input terminal 15A and the first resistor 16A. That is, each first input unit 13A is configured to be able to control whether or not to input a signal to the first storage unit 14A.

The switch control circuit 120 controls opening and closing of each switch unit 121. The switch control circuit 120 controls the opening and closing of each switch unit 121 according to the control of the multiplier-accumulator control circuit 110. In this case, the multiplier-accumulator control circuit 110 outputs, to the switch control circuit 120, an instruction to set the charging current to a predetermined set value. The predetermined set value is, for example, a value that is 1/m (m is a number of 1 or more) of a charging current at the normal time. Specifically, when m is 2, the switch control circuit 120 controls each switch unit 121 so that the charging current is halved. In this case, assuming that the number of switch units 121 is 100, a desired charging current can be achieved by reducing the number to 50, which is a half of the number. Further, when m is 2.5, the switch control circuit 120 controls each switch unit 121 so that the charging current becomes 2/5. In this case, assuming that the number of switch units 121 is 100, a desired charging current can be achieved by reducing the number to 40. The switch control circuit 120 can be achieved by, for example, an electronic circuit including a CPU. Note that a synchronization signal for synchronizing operations is input from the synchronization signal generator 130 to the multiplier-accumulator control circuit 110 and the switch control circuit 120.

Referring to FIG. 8, a description will be given of operations of the switch unit 121. FIG. 8 is diagrams illustrating an example of output patterns for reducing the charging current. In FIG. 8, solid lines indicate that signals are input, and broken lines indicate that signals are not input.

As illustrated in FIG. 8, in a pattern A, an input unit group 13A-1 is instructed to output signals from all of the input units at a normal time, and in the case of reducing the charging current to the first storage unit 14A, is instructed not to output signals from arbitrary input units so that the charging current becomes a specified charging current. In this case, the input units which are not caused to output signals are not predetermined and may be arbitrary. The signal input units to the first storage unit 14A are configured in this way, whereby the normal time and the time of reducing the charging current can be switched.

In a pattern B, the signal input units to the first storage unit 14A are composed of an input unit group 13A-2 and an input unit group 13A-3. In this case, at the normal time, the input unit group 13A-3 outputs signals, but the input unit group 13A-2 does not output signals. Then, in the case of reducing the charging current to the first storage unit 14A, switching is made so as not to output signals from the input unit group 13A-3 and to output signals only from the input unit group 13A-2. That is, the input unit group 13A-2 is configured to output a predetermined charging current at the time when the charging current decreases. The signal input units to the first storage unit 14A are configured in this way, whereby the normal time and the time of reducing the charging current can be switched.

In a pattern C, the signal input units to the first storage unit 14A are composed of an input unit group 13A-1 and an input unit group 13A-2. In this case, at the normal time, the input unit group 13A-1 outputs signals, but the input unit group 13A-2 does not output signals. Then, in the case of reducing the charging current to the first storage unit 14A, signals are output from the input unit group 13A-2, and signals are output from the input unit group 13A-1 so as to make up for a shortage. The signal input units to the first storage unit 14A are configured in this way, whereby the normal time and the time of reducing the current can be switched.

Note that each first input unit 13A includes the first diode 17A in the first embodiment. Therefore, if the first diode 17A can be used as a switch unit, each switch unit 121 may be omitted.

[2-2. Setting of Charging Current and Threshold Voltage]

Figure 9:
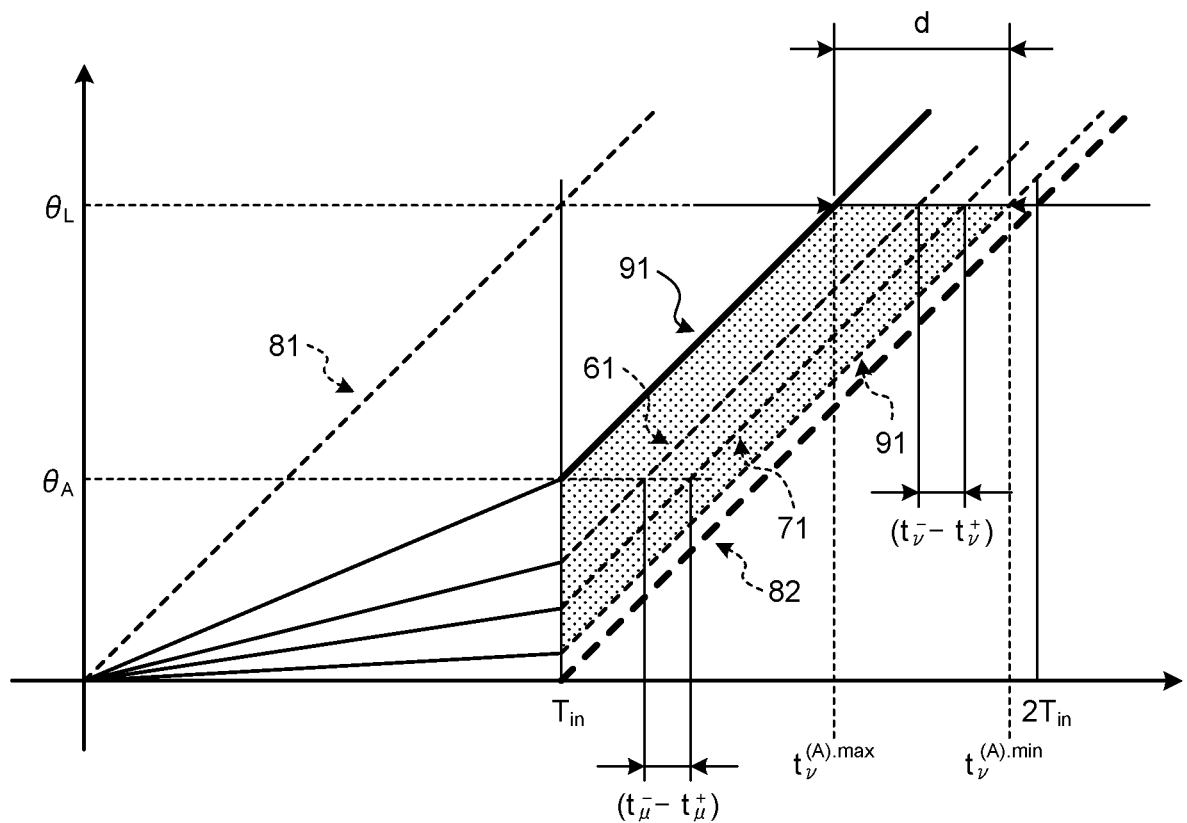
FIG. 9 is a diagram for explaining currents during charging and a threshold voltage.

Referring to FIG. 9, a description will be given of a method for determining the charging current and the threshold voltage. FIG. 9 is a diagram for explaining the charging current and the threshold voltage.

A description will be given of how to determine m when the charging current is set to 1/m of a current at the normal time. In order to calculate m, an output value range of the output of each multiplier-accumulator provided in the multiply-accumulate device 10 is investigated. Then, the distribution of the outputs from each multiplier-accumulator becomes a distribution close to the normal distribution. Here, if the distribution of the outputs of the multiplier-accumulator is the normal distribution, the range of ±2σ includes an output of 95.5%, and the range of ±3σ includes an output of 99.7%. First, in the first embodiment, an upper limit value $t_v^{(A).min}$ and lower limit value $t_v^{(A).max}$ of the timing at which the signal is output are determined. For example, as will be described in detail later, when the upper limit value and the lower limit value are included in ±2σ, approximately 4.5% of the output is present outside the range, and accordingly, the output present in that range will be clipped to an upper limit or a lower limit in processing for expanding output difference timing. When setting the upper limit value and the lower limit value, it is preferable to consider values of the upper limit value and the lower limit value and performance deterioration of the multiplier-accumulator due to insertion of a clip function. For example, if the performance deterioration caused by clipping the output signal cannot be tolerated, it is also considered to expand the output timing to a range lager than ±2σ. When the upper limit value and the lower limit value are determined, $[t_v^{(A).min} - t_v^{(A).max}]$ as a difference between the upper limit value and the lower limit value becomes an output value range before expanding the output timing. A value obtained by dividing such a maximum output value range $T_{in}$ of the multiplier-accumulator by $[t_v^{(A).min} - t_v^{(A).max}]$ becomes a limit magnification $m_{max}$ that expands the output timing. Due to a relationship between the output value range before the expansion and the maximum output value range, such an expansion rate cannot be increased any more.

Then, as a value of $m_{max}$ or less, the actual m just needs to be set arbitrarily by the user. When the user places high importance on such a timing difference expansion rate, $m_{max}$ may be selected as m. When it is not necessary to increase the timing difference expansion rate to the maximum, a value desired by the user just needs to be selected from values of $m_{max}$ or less. More specifically, for example, assuming that the number of switch units 121 is 100 when the charging current is reduced to 1/3, 100/33, which is the maximum number that does not exceed $m_{max}$=3 out of 100/i (i is an integer of 1 to 100), just needs to be set as new $m_{max}$. In this case, the user may arbitrarily set actual m out of 100/j (j is an integer of 34 to 100).

Next, a description will be given of a method for determining the threshold voltage. Specifically, by the increase of the expansion rate, the slope of the charge curve becomes gentle, it takes longer for the charge curve to reach the threshold voltage, and it takes time for the signal to be output. Hence, a threshold voltage after the timing expansion of the output difference is set lower than the threshold voltage before the expansion of the threshold voltage. Such a threshold voltage is calculated based on the above-mentioned lower limit value $t_v^{(A).max}$.

Here, the threshold voltage calculated based on the equation (10) is defined as $θ_L$. Further, a charge curve 91 from $T_{in}$ to the lower limit value $t_v^{(A).max}$, which intersects the horizon of $θ_L$, is considered. Then, a voltage of the charge curve 91 when $t=T_{in}$ is used as a new threshold voltage θA. In FIG. 9, the charge curve is represented by a linear function V(t)=at+b. The slope a is $θ_L/T_{in}$. This is clear from the charge curve 82. The intercept b is $θ_L(1-t_v^{(A).max}/T_{in})$ because V(t)=$θ_L$ when $t=t_v^{(A).max}$. Since the threshold voltage $θ_A$ is obtained when t is $T_{in}$, $θ_A$ becomes $θ_L(2-t_v^{(A).max}/T_{in})$. Thus, $θ_A$ can be calculated. Further, the threshold voltage $θ_A$ calculated in this way is a minimum value settable as the threshold voltage in the present embodiment. That is, the newly set threshold voltage can be arbitrarily set as long as it is a voltage between $θ_A$ and $θ_L$. Further, the threshold voltage $θ_A$ is preferably calculated so that the output signal is output from the first comparison unit 18A between $T_{in}$ and $2T_{in}$. The threshold voltage is changed in this way, whereby a new lower limit value becomes $T_{in}$. Similarly, the upper limit value is also replaced by a new upper limit=(old upper limit−old lower limit+new lower limit)=(old upper limit−old lower limit+$T_{in}$). That is, the threshold voltage is calculated based on the charge curve.

In the charge curve 61, the time when the threshold voltage $θ_A$ is reached is defined as $t_μ^+$. In the charge curve 71, the time when the threshold voltage $θ_A$ is reached is defined as $t_μ^-$. Here, since the charge curve 61 and the charge curve 62 have the same slope, $(t_μ^- - t_μ^+) = (t_μ^- - t_μ^+)$ is established. Hence, even if the threshold voltage is lowered from $θ_L$ to $θ_A$, the difference between the first timing and the second timing does not change.

Note that, though each charge curve is approximated to the linear function in FIG. 9, in actual, the charge curve 81, the charge curve 82, and the charge curve 91 are represented by the following equations (26), (27), and (28), respectively.

$$V_o(t) = V_{in}\left(1 - \exp\left(\frac{-t}{RC}\right)\right), t \geq 0 \quad (26)$$

$$V_o(t) = V_{in}\left(1 - \exp\left(\frac{-(t - T_{in})}{RC}\right)\right), t \geq T_{in} \quad (27)$$

$$V_o(t) = V_{in}\left(1 - \exp\left(\frac{-(t - (T_{in} - d))}{RC}\right)\right), t \geq T_{in} - d \quad (28)$$

In the equations (26) to (28), an input voltage value $V_{in}$ a resistance value R, and a capacitance C are known values. Therefore, even when the charge curves are expressed as the equations (26) to (28), m and $\theta_A$ can be calculated by the same method as when the charge curve is a linear function.

In the present disclosure, the new lower limit value $T_{in}$, the new upper limit value, the timing difference expansion rate m, and the threshold voltage $\theta_A$ are stored in advance in the multiplier-accumulator control circuit 110. That is, the multiplier-accumulator control circuit 110 controls each unit based on the new lower limit value $T_{in}$ the new upper limit value, the timing difference expansion rate m, and the threshold voltage $\theta_A$.

For example, the multiplier-accumulator control circuit 110 sets the threshold voltage $\theta_A$ in advance in the first threshold power supply 19A. In this case, the first threshold power supply 19A supplies the threshold voltage $\theta_A$ to the first comparison unit 18A. The multiplier-accumulator control circuit 110 sets a switching pattern of each switch unit 121 based on, for example, the timing difference expansion rate m. The switching pattern is an instruction to set each switch unit 121 that allows supply of the voltage on and after $T_{in}$ in FIG. 9.

The multiplier-accumulator control circuit 110 calculates, for example, lower limit timing and upper limit timing as the output timing. When $\theta_A$ is used as the threshold voltage, the lower limit timing becomes $T_{in}$ regardless of the timing difference expansion rate m. In this case, the multiplier-accumulator control circuit 110 calculates the upper limit timing according to the value of m. Since the timing difference on and after $T_{in}$ becomes m times, the multiplier-accumulator control circuit 110 calculates m×(new upper limit value−$T_{in}$)+$T_{in}$ and the upper limit timing. As illustrated in FIG. 6, the multiplier-accumulator control circuit 110 outputs a lower limit timing signal, which specifies the calculated lower limit timing, to the first clip circuit 210, and outputs an upper limit timing signal, which specifies the upper limit timing, to the second clip circuit 220. Note that, when an arbitrary value from $\theta_A$ to $\theta L$ is set as the threshold voltage, the multiplier-accumulator control circuit 110 calculates the lower limit timing and the upper limit timing by calculation.

The first clip circuit 210 clips the signal, which is output from the first comparison unit 18A, according to the lower limit timing signal. Then, the first clip circuit 210 outputs the clipped signal to the second clip circuit 220. The second clip circuit 220 clips the signal, which is output from the first clip circuit 210, according to the upper limit timing signal. Then, the second clip circuit 220 outputs the clipped signal to the multiplier-accumulator in the subsequent stage.

[2-3. Clip Circuit]

Referring to FIG. 10, a description will be given of operations of the first clip circuit 210. FIG. 10 is diagrams for explaining the operations of the first clip circuit 210.

A graph 211 illustrated in FIG. 10 illustrates an operation when an input signal that rises at earlier timing than a clip lower limit specified by the lower limit timing signal is input. Specifically, the graph 211 illustrates an operation of the first clip circuit 210 at the time when an input signal that rises at an earlier time $t_a$ than a lower limit time $t_b$ of the clip is input when the lower limit time $t_b$ is specified for the first clip circuit 210. In this case, the first clip circuit 210 clips the timing at which the input signal rises to $t_b$, and outputs the input signal to the second clip circuit 220.

On the other hand, a graph 212 illustrates an operation of the first clip circuit 210 when an input signal that rises at a time $t_a$ later than the lower limit time $t_b$ is input. In this case, the first clip circuit 210 outputs the input signal thus input to the second clip circuit 220 as it is.

FIG. 11 is a true value table illustrating a relationship between the clip lower limit specified in the first clip circuit 210 and the input signal input to the first clip circuit 210. In FIG. 11, 0 represents a state in which the signal is not rising, and 1 represents a state in which the signal is rising. As illustrated in FIGS. 10 and 11, the first clip circuit 210 can be achieved, for example, by an AND circuit.

The second clip circuit 220 clips the signal, which is output from the first clip circuit 210, according to the upper limit timing signal. Then, the second clip circuit 220 outputs the clipped signal to the multiplier-accumulator in the upper layer.

Referring to FIG. 12, a description will be given of operations of the second clip circuit 220. FIG. 12 is diagrams for explaining the operations of the second clip circuit 220.

A graph 221 illustrated in FIG. 12 illustrates an operation when an input signal that rises at earlier timing than a clip upper limit specified by the upper limit timing signal is input. Specifically, the graph 221 illustrates an operation of the second clip circuit 220 at the time when an input signal that rises at an earlier time $t_c$ than an upper limit time $t_d$ of the clip is input when the upper limit time $t_d$ is specified for the second clip circuit 220. In this case, the second clip circuit 220 outputs the input signal thus input to the multiplier-accumulator in the upper layer as it is.

On the other hand, a graph 222 illustrates an operation of the second clip circuit 220 when an input signal that rises at a time $t_c$ later than the upper limit time $t_d$ is input. In this case, the second clip circuit 220 clips the timing at which the input signal rises to $t_d$, and outputs the input signal to the upper multiplier-accumulator.

FIG. 13 is a true value table illustrating a relationship between the clip upper limit specified in the second clip circuit 220 and the input signal input to the second clip circuit 220. In FIG. 13, 0 represents a state in which the signal is not rising, and 1 represents a state in which the signal is rising. As illustrated in FIGS. 12 and 13, the second clip circuit 220 can be achieved, for example, by an OR circuit.

Figure 14:
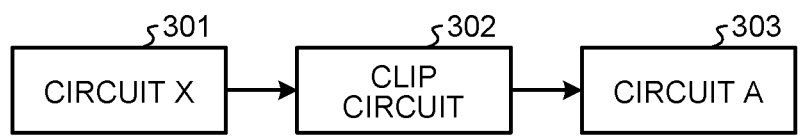
FIG. 14 is a diagram for explaining an effect of clipping an input signal.

Referring to FIG. 14, a description will be given of an effect of clipping the input signal. FIG. 14 is a diagram for explaining the effect of clipping the input signal.

FIG. 14 illustrates a circuit X 301, a clip circuit 302, and a circuit A 303. The circuit X 301 is, for example, a circuit that executes a predetermined calculation such as multiplication and addition inside the device. That is, the clip circuit 302 having a clip function is provided immediately after the circuit X 301 that executes the calculation. Note that the clip circuit 302 may be provided immediately after an external input terminal. The circuit A 303 is provided after the clip circuit 302. In the circuit A 303, a minimum value and maximum value of input values that can be accepted are determined. In such a case, the clip circuit 302 clips the signal, which is output from the circuit X 301, so as to satisfy a condition of the circuit A 303.

For example, the case where an integer-format register added with an 8-bit code is used for an input unit of the circuit A 303 is considered. In such a case, the input unit of the circuit A 303 cannot handle numeric values exceeding +127 and numeric values lower than −128. Accordingly, among the signals input from the circuit X 301, the clip circuit 302 clips the numeric values, which exceed +127, to +127, and clips the numeric values, which are less than −128, to −128. Thus, the input unit of the circuit A 303 can handle all of the input signals.

Although digital signals have been described as examples in FIG. 14, the clip circuit 302 is not limited to the one that clips the digital signals. The same applies when the input of the circuit A 303 is an analog voltage, an analog current, a time width, or the like.

Figure 15:
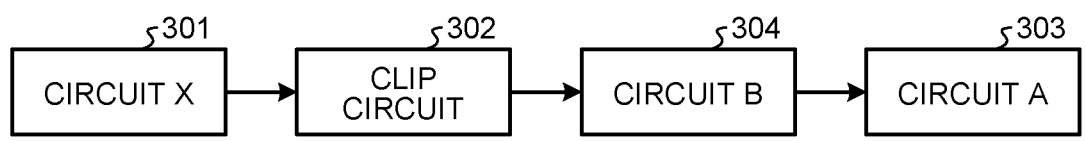
FIG. 15 is a diagram for explaining an effect of clipping an input signal.

Further, as illustrated in FIG. 15, the case where a circuit B 304 is provided between the clip circuit 302 and the circuit A 303 is considered. The circuit B 304 is a circuit that executes a predetermined calculation for an input signal. In such a case, the clip circuit 302 may set the clip value so as to perform the clipping in consideration of an influence of the circuit B 304. For example, it is assumed that the circuit B 304 is a circuit that adds a constant +10 to the input signal. In this case, among the signals input from the circuit X 301, the clip circuit 302 is set so as to clip numeric values, which exceed +117, to +117, and clips numeric values, which are less than −138, to −138. Thus, the input unit of the circuit A 303 can handle all of the input signals.

Referring to FIG. 6 again, a description will be given of operations of the first multiplier-accumulator 11Aa. First, between time 0 and time $T_{in}$, to each first input terminal 15A of the first multiplier-accumulator 11Aa, an input signal expressed by timing (time) is input from the multiplier-accumulator (not illustrated) in the previous stage or a digital to timing converter (DTC) circuit (not illustrated). At time $T_{in}$, according to the control of the multiplier-accumulator control circuit 110, the switch control circuit 120 transmits a control signal to each switch unit 121, and switches each switch unit 121 to a specific pattern. Thus, the charging current on and after the time $T_{in}$ becomes 1/m of that of the normal time, and the first storage unit 14A is charged according to the charge curve of the current of 1/m of that of the normal time. Then, the first comparison unit 18A outputs the step waveform to the first clip circuit 210 at the timing at which a charging voltage of the first storage unit 14A becomes equal to the preset threshold voltage θA.

Further, the multiplier-accumulator control circuit 110 outputs the lower limit timing signal to the first clip circuit 210 when the time reaches the lower limit timing. The first clip circuit 210 clips a signal, which rises at too early timing in the step waveform output by the first comparison unit 18A, to the lower limit timing according to the lower limit timing signal, and outputs the clipped signal to the second clip circuit 220. Further, the multiplier-accumulator control circuit 110 outputs the upper limit timing signal to the second clip circuit 220 when the time reaches the upper limit timing. The second clip circuit 220 clips a too late input signal among the input signals, which are input from the first clip circuit 210, to the upper limit timing according to the upper limit timing signal, and outputs the clipped input signal to the multiplier-accumulator in the subsequent stage.

[2-4. Modified Example of Multiplier-Accumulator According to First Embodiment]

Figure 16:
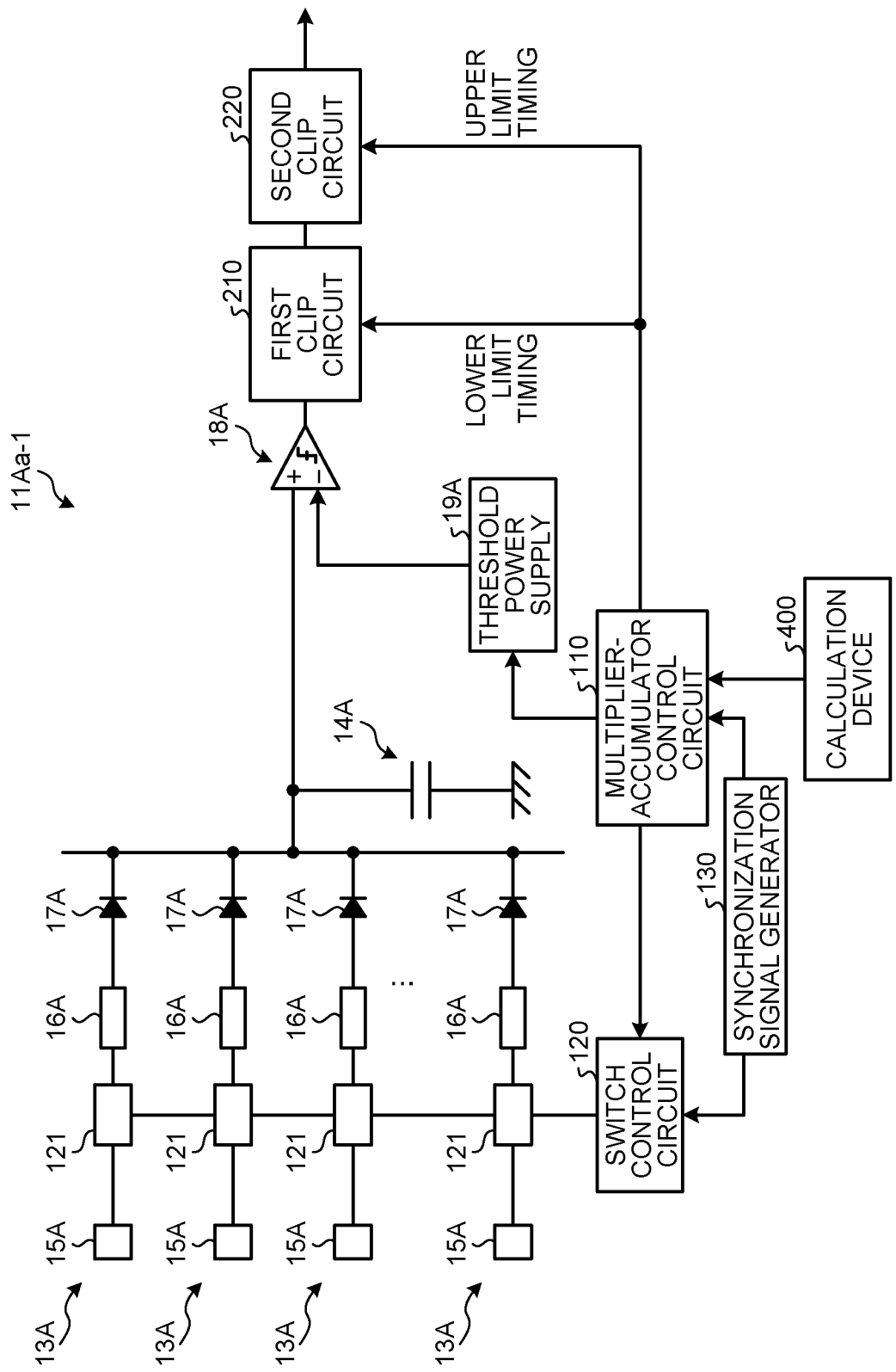
FIG. 16 is a diagram illustrating an example of a modified example of the multiplier-accumulator of the multiply-accumulate device according to the first embodiment of the present disclosure.

FIG. 16 illustrates a modified example of the multiply-accumulate device according to the first embodiment. In the first embodiment, it is assumed that the new lower limit value $T_{in}$, the new upper limit value, the timing difference expansion rate m, and the threshold voltage $θ_A$ are stored in advance. The modified example of the first embodiment may perform the calculation, for example, before a multiplier-accumulator 11Aa-1 is operated. In this case, for example, as illustrated in FIG. 16, a calculation device 400 may be provided inside or outside the multiply-accumulate device 10, each parameter may be calculated by the calculation device 400, and may be input to the multiplier-accumulator control circuit 110. Such a calculation device 400 can be achieved by, for example, an electronic circuit including a CPU.

As mentioned above, in the first embodiment, the charging current of the multiplier-accumulator is reduced, and the threshold voltage is lowered, whereby the output difference timing can be expanded without delaying the time until the output signal is output.

3. Second Embodiment

[3-1. Configuration of Multiplier-Accumulator of Multiply-Accumulate Device According to Second Embodiment]

Figure 17:
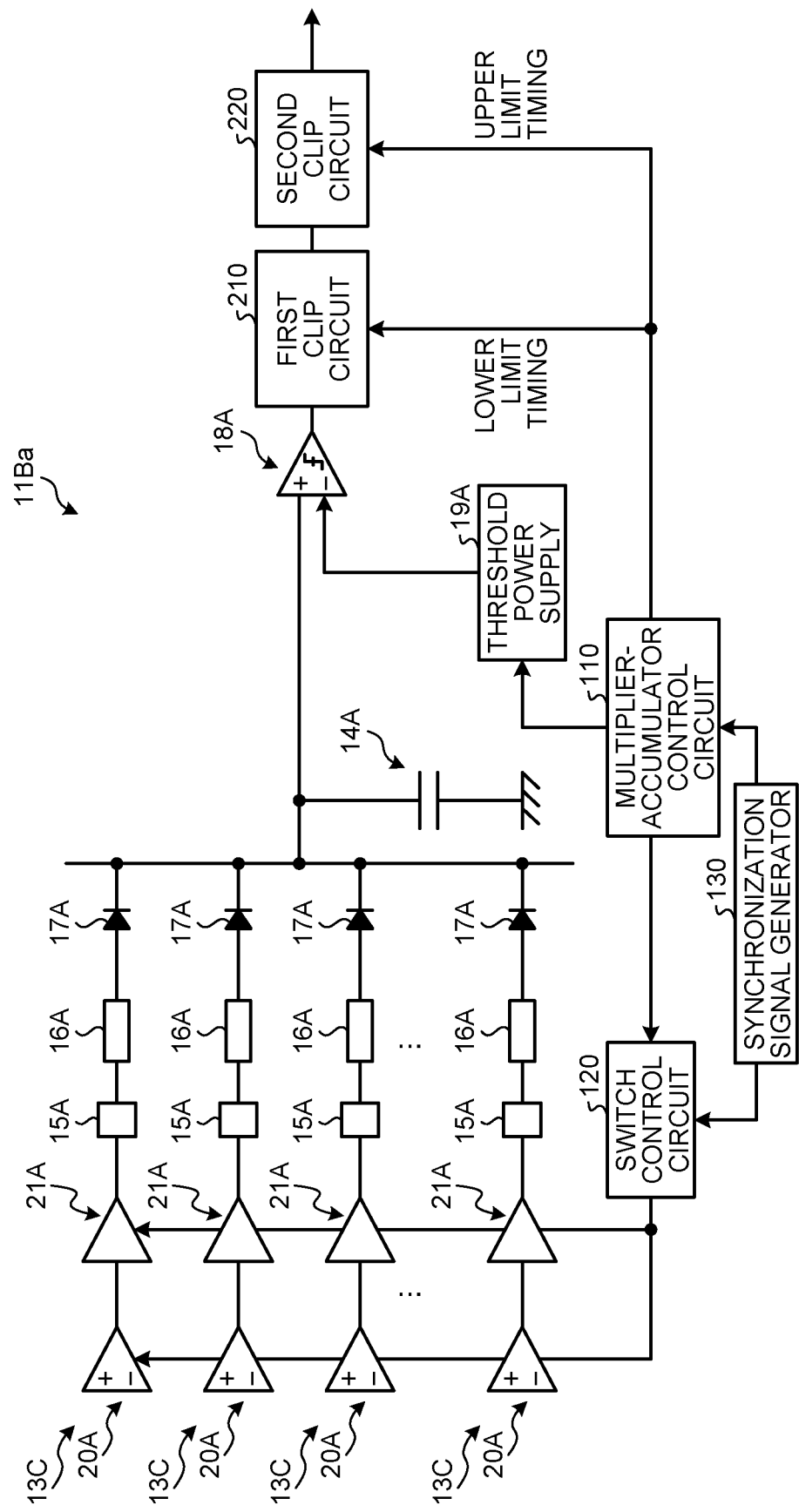
FIG. 17 is a diagram illustrating an example of a multiplier-accumulator of a multiply-accumulate device according to a second embodiment of the present disclosure.

Referring to FIG. 17, a description will be given of a multiplier-accumulator of a multiply-accumulate device according to a second embodiment of the present disclosure. FIG. 17 is a diagram illustrating an example of the multiplier-accumulator of the multiply-accumulate device according to the second embodiment.

Each input unit 13C of a multiplier-accumulator 11Ba includes a first input terminal 15A, a first resistor 16A, and a first diode 17A. Further, each input unit 13C includes at least one of a previous-stage comparison unit 20A and an output buffer 21A.

The previous-stage comparison unit 20A is a comparison unit provided in a multiplier-accumulator in a previous stage to the multiplier-accumulator 11Ba. The output buffer 21A temporarily stores an output signal output by the previous-stage comparison unit 20A.

In the second embodiment, when including both of the previous-stage comparison unit 20A and the output buffer 21A, the switch control circuit 120 stops an output of the previous-stage comparison unit 20A or the output buffer 21A. When including only one of the previous-stage comparison unit 20A and the output buffer 21A, the switch control circuit 120 stops the one that is present. In this case, the multiplier-accumulator control circuit 110 outputs, to the switch control circuit 120, an instruction to set a charging current to a predetermined set value. Thus, the second embodiment can reduce the charging current.

Further, when the multiplier-accumulator 11Ba is in a first stage in the multiply-accumulate device 10, a DTC is connected to the first input terminal 15A. In this case, the switch control circuit 120 can stop the output of the DTC to reduce the charging current.

As mentioned above, in the second embodiment, the charging current of the multiplier-accumulator is reduced, and the threshold voltage is lowered, whereby the output difference timing can be expanded without delaying the time until the output signal is output.

Although the respective embodiments of the present disclosure have been described above, the technical scope of the present disclosure is not limited to the above-mentioned respective embodiments as they are, and various modifications can be made without departing from the spirit of the present disclosure. Further, constituents which cover different embodiments and modified examples may be combined with one another as appropriate.

Note that the effects described in the present specification are merely examples and are not limited, and other effects may be present.

Note that the present technology may also adopt such configurations as follows.

(1)

A multiply-accumulate device comprising:
  a comparison unit that compares, with a threshold voltage,
    a voltage generated by an electric charge stored in a storage unit, and outputs an output signal at timing at which the voltage exceeds the threshold voltage; and a control circuit that reduces, based on a predetermined set value, a charging current to the storage unit from a plurality of input units connected to the storage unit.

(2)

The multiply-accumulate device according to (1), wherein the control circuit lowers the charging current by changing a number of the plurality of input units which output signals to the storage unit.

(3)

The multiply-accumulate device according to (2), wherein the control circuit changes the number of the plurality of input units when a first time is reached.

(4)

The multiply-accumulate device according to (2) or (3), wherein the control circuit lowers the charging current by controlling switch units provided in the plurality of input units.

(5)

The multiply-accumulate device according to (2) or (3), wherein the control circuit lowers the charging current by stopping an output of a multiplier-accumulator in a previous stage or an output buffer connected to the multiplier-accumulator in the previous stage.

(6)

The multiply-accumulate device according to any one of (1) to (5), wherein the control circuit lowers the threshold voltage supplied to the comparison unit.

(7)

The multiply-accumulate device according to (6), wherein the control circuit lowers the threshold voltage based on a value of the voltage of the storage unit.

(8)

The multiply-accumulate device according to (6) or (7), wherein the control circuit lowers the threshold voltage so that the threshold voltage becomes equal to or higher than a maximum value of a voltage of the storage unit at a first time when the output signal is output from the comparison unit at earliest timing.

(9)

The multiply-accumulate device according to any one of (6) to (8), wherein the control circuit lowers the threshold voltage from the first time so that the threshold voltage becomes equal to or lower than a minimum value of a voltage of the storage unit at a second time having a same time length as a time length of the first time.

(10)

The multiply-accumulate device according to any one of (1) to (9), further comprising:

a first clip circuit that clips a minimum value of the output signal to a first value; and a second clip circuit that clips a maximum value of the output signal to a second value.

(11)

The multiply-accumulate device according to (10), wherein the first clip circuit is composed of an AND circuit.

(12)

The multiply-accumulate device according to (10) or (11), wherein the second clip circuit is composed of an OR circuit.

(13)

The multiply-accumulate device according to any one of (1) to (12), further comprising a calculation device that calculates the set value.

(14)

A multiply-accumulate method comprising:

comparing, with a threshold voltage, a voltage generated by an electric charge stored in a storage unit, and outputting an output signal at timing at which the voltage exceeds the threshold voltage; and reducing, based on a predetermined set value, a charging current to the storage unit from a plurality of input units connected to the storage unit.

REFERENCE SIGNS LIST

10 MULTIPLY-ACCUMULATE DEVICE
11, 11a, 11A MULTIPLIER-ACCUMULATOR
12 EXTERNAL INPUT UNIT
13, 13C INPUT UNIT
13A FIRST INPUT UNIT
13B SECOND INPUT UNIT
14 STORAGE UNIT
14A FIRST STORAGE UNIT
14B SECOND STORAGE UNIT
15 INPUT TERMINAL
15A FIRST INPUT TERMINAL
15B SECOND INPUT TERMINAL
16 RESISTOR
16A FIRST RESISTOR
16B SECOND RESISTOR
17 DIODE
17A FIRST DIODE
17B SECOND DIODE
18 COMPARISON UNIT
18A FIRST COMPARISON UNIT
18B SECOND COMPARISON UNIT
19 THRESHOLD POWER SUPPLY
19A FIRST THRESHOLD POWER SUPPLY
19B SECOND THRESHOLD POWER SUPPLY
110 MULTIPLIER-ACCUMULATOR CONTROL CIRCUIT
120 SWITCH CONTROL CIRCUIT
130 SYNCHRONIZATION SIGNAL GENERATOR
210 FIRST CLIP CIRCUIT
220 SECOND CLIP CIRCUIT

The invention claimed is:

1. A multiply-accumulate device comprising:

a comparator configured to compare, with a threshold voltage, a voltage generated by an electric charge stored in a storage circuit, and to output an output signal at a timing at which the voltage exceeds the threshold voltage; and a control circuit configured to reduce, based on a predetermined set value, a charging current provided to the storage circuit from a plurality of inputs connected to the storage circuit, wherein the control circuit reduces the charging current by changing a number of the plurality of inputs which provide the charging current to the storage circuit.

2. The multiply-accumulate device according to claim 1, wherein the control circuit changes the number of the plurality of inputs that provide the charging current to the storage circuit when a first time is reached.

3. The multiply-accumulate device according to claim 1, wherein the control circuit reduces the charging current by controlling switches respectively corresponding to the plurality of inputs.

4. The multiply-accumulate device according to claim 1, wherein the control circuit reduces the charging current by stopping an output of a multiplier-accumulator in a previous stage or an output buffer connected to the multiplier-accumulator in the previous stage.

5. The multiply-accumulate device according to claim 1, wherein the control circuit reduces the threshold voltage supplied to the comparator.

6. The multiply-accumulate device according to claim 5, wherein the control circuit reduces the threshold voltage based on a value of the voltage of the storage circuit.

7. The multiply-accumulate device according to claim 1, further comprising a calculation circuit that calculates the predetermined set value.

8. A multiply-accumulate device comprising:
a comparator configured to compare, with a threshold voltage, a voltage generated by an electric charge stored in a storage circuit, and to output an output signal at a timing at which the voltage exceeds the threshold voltage; and
a control circuit configured to reduce, based on a predetermined set value, a charging current provided to the storage circuit from a plurality of inputs connected to the storage circuit,
wherein the control circuit reduces the threshold voltage supplied to the comparator based on a value of the voltage of the storage circuit, and
the control circuit reduces the threshold voltage so that the threshold voltage becomes equal to or higher than a maximum value of a voltage of the storage circuit at a first time when the output signal is output from the comparator.

9. The multiply-accumulate device according to claim 8, wherein the control circuit reduces the threshold voltage from the first time so that the threshold voltage becomes equal to or lower than a minimum value of a voltage of the storage circuit at a second time having a same time length as a time length of the first time.

10. A multiply-accumulate device comprising:
a comparator configured to compare, with a threshold voltage, a voltage generated by an electric charge stored in a storage circuit, and to output an output signal at a timing at which the voltage exceeds the threshold voltage;
a control circuit configured to reduce, based on a predetermined set value, a charging current provided to the storage circuit from a plurality of inputs connected to the storage circuit;
a first clip circuit that clips a minimum value of the output signal to a first value; and
a second clip circuit that clips a maximum value of the output signal to a second value.

11. The multiply-accumulate device according to claim 10, wherein the first clip circuit is composed of an AND circuit.

12. The multiply-accumulate device according to claim 10, wherein the second clip circuit is composed of an OR circuit.

13. A multiply-accumulate method comprising:
comparing, with a threshold voltage, a voltage generated by an electric charge stored in a storage circuit, and to output an output signal at a timing at which the voltage exceeds the threshold voltage; and
reducing, based on a predetermined set value, a charging current provided to the storage circuit from a plurality of inputs connected to the storage circuit,
wherein reducing the charging current is performed by changing a number of the plurality of inputs which provide the charging current to the storage circuit.

* * * * *